United States Patent
Shah et al.

(10) Patent No.: US 10,599,860 B2
(45) Date of Patent: Mar. 24, 2020

(54) ACCESSING ENTERPRISE DATA

(71) Applicant: Tata Consultancy Services Limited, Mumbai, Maharashtra (IN)

(72) Inventors: Viral Prakash Shah, Vikhroli (IN); Shobhit Shukla, Vikhroli (IN); Anurag Agrawal, Vikhroli (IN); Vikrant Chaudhery, Vikhroli (IN)

(73) Assignee: Tata Consultancy Services Limited, Mumbai (IN)

( * ) Notice: Subject to any disclaimer, the term of this patent is extended or adjusted under 35 U.S.C. 154(b) by 489 days.

(21) Appl. No.: 14/533,878

(22) Filed: Nov. 5, 2014

(65) Prior Publication Data

US 2015/0339484 A1    Nov. 26, 2015

(30) Foreign Application Priority Data

May 22, 2014   (IN) .......................... 1721/MUM/2014

(51) Int. Cl.
| | |
|---|---|
| *G06F 16/9535* | (2019.01) |
| *G06F 21/62* | (2013.01) |
| *H04L 29/08* | (2006.01) |

(52) U.S. Cl.
CPC ...... *G06F 21/6218* (2013.01); *G06F 16/9535* (2019.01); *H04L 67/02* (2013.01)

(58) Field of Classification Search
CPC ............ G06F 17/30861; G06F 16/164; G06F 16/168; G06F 16/252; G06F 16/9535
See application file for complete search history.

(56) References Cited

U.S. PATENT DOCUMENTS

| | | | |
|---|---|---|---|
| 6,854,120 B1 * | 2/2005 | Lo .......................... | G06Q 10/06 719/311 |
| 6,993,657 B1 | 1/2006 | Renner et al. | |
| 2001/0011341 A1 * | 8/2001 | Hayes, Jr. ............. | G06F 9/4443 712/11 |
| 2002/0069081 A1 * | 6/2002 | Ingram ............... | G06F 17/2247 715/700 |
| 2002/0161826 A1 * | 10/2002 | Arteaga .................. | H04L 29/06 709/203 |
| 2003/0004882 A1 * | 1/2003 | Holler ...................... | G06F 8/65 705/51 |
| 2003/0126136 A1 * | 7/2003 | Omoigui ............. | G06F 17/3089 |

(Continued)

*Primary Examiner* — Apu M Mofiz
*Assistant Examiner* — Sheryl L Holland
(74) *Attorney, Agent, or Firm* — Banner & Witcoff, Ltd.

(57) ABSTRACT

A method for accessing enterprise data is described herein. In an implementation, the method comprises receiving, by an application server), a login request from the user equipment, wherein the login request comprises login credentials corresponding to a user. Further, upon successful authentication of the user, user permissions corresponding to the user are ascertained based on one or more predetermined parameters. Further, a default application list is filtered based on the user permissions to obtain a user specific application list corresponding to the user, wherein the application list comprises a plurality of enterprise resource planning (ERP) modules, and wherein the user specific application list comprises one or more ERP modules from amongst the plurality of ERP modules. The method further comprises rendering the user specific application list to the user equipment for providing access to data corresponding to the one or more ERP modules over the web browser.

17 Claims, 2 Drawing Sheets

(56) References Cited

U.S. PATENT DOCUMENTS

| | | | |
|---|---|---|---|
| 2003/0140308 A1* | 7/2003 | Murthy | G06F 17/30917 715/234 |
| 2005/0044524 A1* | 2/2005 | Murray | G06F 9/44526 717/101 |
| 2005/0289524 A1* | 12/2005 | McGinnes | G06F 8/10 717/140 |
| 2006/0173951 A1* | 8/2006 | Arteaga | H04L 67/1095 709/203 |
| 2008/0020737 A1* | 1/2008 | Neil | G06F 9/44505 455/414.1 |
| 2008/0250057 A1* | 10/2008 | Rothstein | G06F 17/30286 |
| 2009/0183251 A1* | 7/2009 | Deinlein | G06F 17/30861 726/12 |
| 2010/0023522 A1* | 1/2010 | Madathilparambil | G06F 17/30067 707/E17.005 |
| 2010/0024036 A1* | 1/2010 | Morozov | G06F 21/53 726/26 |
| 2010/0121975 A1* | 5/2010 | Sinha | H04L 65/103 709/231 |
| 2010/0174974 A1* | 7/2010 | Brisebois | G06F 17/243 715/223 |
| 2010/0263025 A1* | 10/2010 | Neitzel | H04L 63/105 726/4 |
| 2011/0153368 A1* | 6/2011 | Pierre | G06Q 10/067 705/4 |
| 2013/0253904 A1* | 9/2013 | Heller | G06F 17/30905 704/8 |
| 2014/0032691 A1* | 1/2014 | Barton | H04L 41/00 709/206 |
| 2014/0108793 A1* | 4/2014 | Barton | G06F 21/6218 713/165 |
| 2014/0337528 A1* | 11/2014 | Barton | H04L 41/00 709/225 |

* cited by examiner

ACCESSING ENTERPRISE DATA

TECHNICAL FIELD

The present subject matter relates, in general, to accessing enterprise data and, particularly but not exclusively, to accessing data pertaining to a plurality of enterprise resource planning (ERP) modules of an enterprise.

BACKGROUND

Enterprises nowadays implement enterprise resource planning (ERP) for management and storage of data pertaining to different functional areas of the enterprise. In an ERP framework, examples of the functional areas, also referred to as ERP modules, of an enterprise include, but are not limited to, finance, human resource, manufacturing, supply chain management, project management, and customer relationship management. Typically, the data pertaining to the ERP modules is stored in a database accessible to the employees of the enterprise. The employees may access the data using computing devices, such as computers, laptops, and workstation computers.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to accessing data pertaining to a plurality of enterprise resource planning (ERP) modules of an enterprise.

ERP facilitates in management and storage of data pertaining to different ERP modules, for example, project management, human resource, and manufacturing, of an enterprise. Typically, in an ERP framework, the data pertaining to each of the ERP modules may be accessed via a computing device, for example, a laptop, a desktop, and a smart phone, using a corresponding application. Further, each ERP module may be accessed using a corresponding application, owing to which a user may have to install various ERP applications. However, implementation of different applications may prove to be a cumbersome and time consuming task. For example, the user may have to frequently update the applications pertaining to the ERP modules. Further, operation of the different applications over a computing device with limited computational power, such as a smart phone, may affect performance of the computing device. For instance, owing to limited resources, for example, memory and processor, the computing device may not be able to efficiently run the applications.

Moreover, certain applications may be designed for running on a specific operating system (OS). As a result, such applications may not run on a computing device running on an OS different than the OS for which the application was designed. Thus, the scalability of such applications is highly reduced. Further, a vendor of the ERP framework may have to maintain different versions of the applications for different enterprises based on their respective requirements. Thus, the vendor may have to deploy a separate server for each enterprise. As a result, overall implementation cost of rendering the ERP framework to the enterprises may increase. Further, based on the respective requirements of each of the companies, the vendor may have to modify a code base of the application which may prove to be a cumbersome task.

The present subject matter relates to accessing data pertaining to a plurality of enterprise resource planning (ERP) modules of an enterprise, in accordance with an embodiment of the present subject matter. According to said embodiment, access to data pertaining to the ERP modules may be provided through a web browser running on a user equipment, for example, a mobile phone, a smart phone, a PDA, and a tablet. As a result, the downloading and maintenance of different applications pertaining to the ERP modules may be averted, thereby reducing the consumption of the user equipment's resources.

According to an implementation of the present subject matter, an application server may receive a login request from the user equipment. The login request may include login credentials corresponding to a user seeking to access the data. In a case where the user is successfully authenticated, user permissions corresponding to the user may be ascertained based on one or more parameters. Example of the predetermined parameters may include, but are not limited to, one or more configurations pertaining to the enterprise of the user and a user profile of the user. As may be understood, the configurations may be based on pre-defined policies and requirements of an enterprise with which the user is employed.

Based on the user permissions, a default application list may be filtered to obtain a user specific application list. The default application list may be understood as a list comprising a plurality of ERP modules for which services are rendered by a service provider. In an example, one or more ERP modules may be selected from the ERP modules based on the user permissions. The selected ERP modules may then be compiled in the user specific application list. In an example, the application list and the specific application list may be in the form of an XML file.

Thereafter, the user specific application list may be rendered to the user over the web browser. The user may subsequently request for data pertaining to one or more sub-modules of the ERP modules specified in the user specific application list. Based on the user's request, the data may be rendered to the user equipment for being displayed through the web browser.

Thus, in accordance with the present subject matter, the data may be accessed over the web-browser running on the user equipment. As a result, installation of applications pertaining to each of the ERP modules on the user equipment is averted. Further, consumption of the computing device's resources, such as memory and processor, is reduced. Moreover, in accordance with the present subject matter, the applications are independent of the OS supported by the user equipment as the applications are rendered to the user over the web-browser. As a result, scalability of the applications is increased. Further, in accordance with the present subject matter, different configurations for different enterprises may be maintained in a database associated with the application server. Based on the configurations corresponding to an enterprise, a specific list of the ERP modules may be rendered to a user associated with the enterprise.

Thus, modification of codebase for different enterprises is averted. As a result, the present subject matter results in a multi-tenant solution for rendering access to data pertaining to the enterprises.

These and other advantages of the present subject matter would be described in greater detail in conjunction with the following figures. While aspects of described systems and methods for accessing enterprise data can be implemented in any number of different computing systems, environments, and/or configurations, the embodiments are described in the context of the following device(s).

Figure 1:
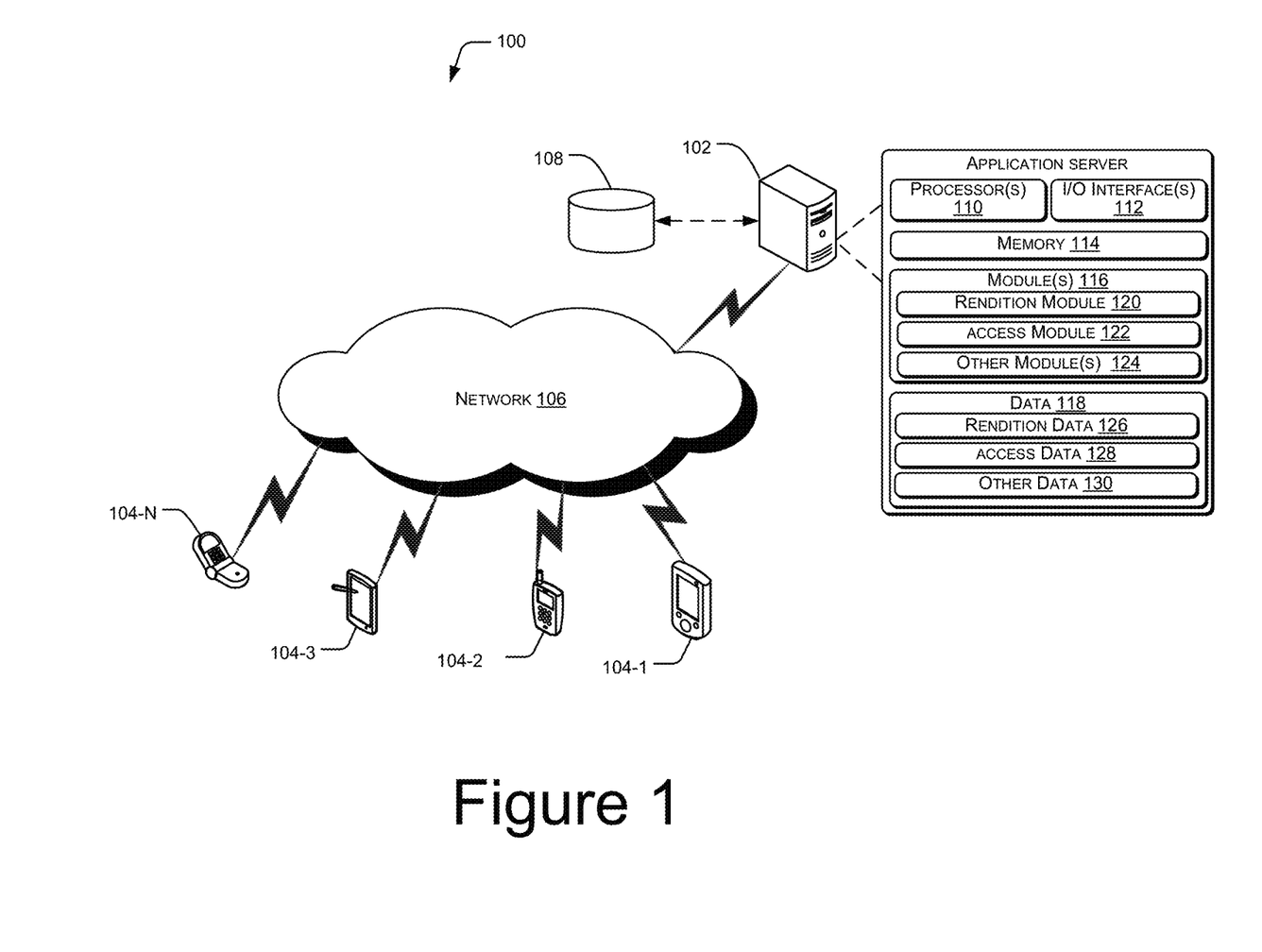
FIG. 1 illustrates a network environment for accessing enterprise data, in accordance with an implementation of the present subject matter.

FIG. 1 illustrates a network environment 100 implementing accessing enterprise data, according to an embodiment of the present subject matter. The network environment 100 includes an application server 102 in communication with a plurality of user equipment 104-1, 104-2, 104-3, . . . , and 104-N, hereinafter collectively referred to as user equipment (UEs) 104 and individually referred to as a UE 104, through a network 106. Communication links between the application server 102 and the UEs 104 are enabled through a desired form of communication, for example, via dial-up modem connections, cable links, digital subscriber lines (DSL), wireless or satellite links, or any other suitable form of communication.

In an implementation, the application server 102 may be implemented as one or more systems or user equipment, such as a cloud server, a mainframe computer, a workstation, a multiprocessor system, a network computer, and a gateway server. In an example, the application server 102 may be provisioned to provide access to enterprise data through a web browser running on the UE 104. The enterprise data may be stored in a database 108. The database 108 is communicatively coupled to the application server 102. In an implementation, examples of the UE 104 may include, but are not limited to, a mobile phone, a smart phone, a personal digital assistant (PDA), and a tablet.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. Further, the network 106 may include network devices that may interact with the application server 102 and the user equipment 104 through communication links.

In one implementation, application server 102 may include one or more processor(s) 110, I/O interfaces 112, and a memory 114 coupled to the processor 110. The processor 110 can be a single processing unit or a number of units, all of which could include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The I/O interfaces 112 may include a variety of software and hardware interfaces, for example, interfaces for peripheral device(s), such as a keyboard, a mouse, a display unit, an external memory, and a printer. Further, the I/O interfaces 112 may enable the application server 102 to communicate with other devices, such as, the UEs 104, the database 108, web servers, and other external databases. The I/O interfaces 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interfaces 112 include one or more ports for connecting a number of computing systems with one another or to a network.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the application server 102 also includes module(s) 116 and data 118.

The module(s) 116, amongst other things, include routines, programs, objects, components, data structures, etc., which perform particular tasks or implement data types. The module(s) 116 may also be implemented as, signal processor(s), state machine(s), logic circuitries, and/or any other devices or components that manipulate signals based on operational instructions.

Further, the module(s) 116 can be implemented in hardware, instructions executed by a processing unit, or by a combination thereof. The processing unit can comprise a computer, a processor, such as the processor 110, a state machine, a logic array, or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the module(s) 116 may be machine-readable instructions (software) which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via a network connection.

In one implementation, the module(s) 116 further includes a rendition module 120, an access module 122, and other module(s) 124. The other modules 124 may include programs or coded instructions that supplement applications and functions of the application server 102.

The data 118 serves, amongst other things, as a repository for storing data processed, received, and generated by one or more of the module(s) 116. The data 118 includes rendition data 126, access data 128, and other data 130. The other data 130 includes data generated as a result of the execution of one or more modules in the module(s) 116.

In an example, a service provider may implement the application server 102 for offering ERP to a plurality of enterprises. In an example, for rendering the ERP, the application server 102 may have a single instance of an application through which data pertaining to a plurality of ERP modules, for example, human resource, project management, and customer relationship management may be offered to the enterprise.

Further, for each of the enterprise registered with the service provider, corresponding data may be stored in the database 108. Among other things, the database 108 may include one or more configurations and a schema corresponding to each of the enterprises. Further, the database

108 may include, for each of the enterprises, a user profile of each employee associated with the enterprise. The employee may be interchangeably referred to as user, hereinafter.

In an example, a user seeking to access data corresponding to his enterprise may transmit a login request to the application server 102. The login request may include login credentials, for example, a user name and a password, corresponding to the user. In said example, the login request may be sent through a web browser running on a UE, such as the UE 104-1. In an example, the request may be sent using one of a Hypertext Transfer Protocol (HTTP) and a Hypertext Transfer Protocol Secure (HTTPS).

In another example, the user seeking to access the data may use an enterprise account pertaining to the enterprise. As may be understood, the enterprise account may provide the user with access to all the ERP modules corresponding to the enterprise. In said example, the login credentials may include an enterprise id and a password.

In an implementation, the rendition module 120 may receive the login request from the UE 104-1. Upon receiving the login credentials, the rendition module 120 may access user data corresponding to the enterprise for authenticating the user. As may be understood, the user data may include details pertaining to all the employees of an enterprise. Upon accessing the user data, the rendition module 120 may verify the login credentials received from the UE 104-1 based on the user data. In case of a successful match, the rendition module 120 may authenticate the user.

In a case where the user is successfully authenticated, the rendition module 120 may ascertain user permissions corresponding to the user based on one or more predetermined parameters. As may be understood, the user permissions may indicate one or more ERP modules which the user may be allowed to access. Further, in a case where the login credentials correspond to the enterprise account, the user permissions may indicate permission to access all the ERP modules pertaining to the enterprise. In said case, the permissions may be referred to as enterprise permissions. Further, as may be understood, the user permissions and the enterprise permissions are configurable and may be configured by an administrator. Examples of the predetermined parameters may include, but are not limited to, the configurations corresponding to the enterprise of the user and a user profile of the user. As mentioned previously, the configurations and the user profiles are stored in the database 108. In said example, the rendition module 120 may retrieve the configurations and the user profile of the user from the database 108 for ascertaining the user permissions.

In an implementation, upon ascertaining the user permissions, the rendition module 120 may filter a default application list based on the user permissions to obtain a user specific application list corresponding to the user. As may be understood, the default application list comprises a plurality of ERP modules for which the services are rendered by the service provider. In an example, the default application list may be stored in the database 108. In said example, the rendition module 120 may retrieve the default application list from the database 108 and store it in the rendition data 126. Thereafter, the rendition module 120 may parse the default application list based on the user permissions corresponding to the user for obtaining the user specific application list. As may be understood, while parsing the default application list, only the ERP modules which are accessible to the user based on the user permissions may be selected from the ERP modules specified in the default application list. In the above example, where the user permissions correspond to the enterprise account, all the ERP modules subscribed by the enterprise may be included in the user specific application list. Thus, in said case, the user specific application list comprises all the ERP modules of the enterprise. The ERP modules selected after the parsing may then be compiled in the user specific application list. The user specific application list may be stored in the rendition data 126. In an example, the default application list and the user specific application list may be in the form of an XML list. The rendition module 120 may then render the user specific application list to the UE 104-1 for displaying to the user through the web-browser of the UE 104-1.

In an example, the user may seek to access an ERP module from the user specific application list. As may be understood, the user may select any of the ERP modules, such as e-Wellness, Education, finance, manufacturing, supply chain management, project management, and customer relationship management. Depending upon the ERP selected, the corresponding sub-modules may be provided to the user. In said example, the UE 104-1 may transmit a user request to the application server 102. In an implementation, the access module 122 may receive the user request from the user device 104-1. Upon receiving the user request, the access module 122 may then retrieve one or more sub-modules pertaining to the ERP module from the access data 128. For example, in a case where the user may select the human resource ERP module, the access module 122 may retrieve corresponding sub-modules, for example, leaves, loans, advance, travel, on duty, training, and leave encash, from the access data 128. The access module 122 may then render the one or more sub-modules to the UE 104-1 for displaying to the user through the web-browser.

Thereafter, in an implementation, the access module 122 may receive a data access request from the UE 104-1 for accessing data corresponding to a sub-module from amongst the sub-modules. For instance, in a case where the user has selected the manufacturing ERP module, the user may then seek to access data corresponding to a sub-module, say, Sales Invoice of the manufacturing ERP module. As may be understood, the data may include reports, statistics, information pertaining to the sub-module in various formats, for example, portable document format (PDF) and word format. Further, depending upon the ERP module, the data access request may facilitate in performing several other functions, such as, approving/declining tasks, sending pre-configured mails, and downloading documents pertaining to a sub-module of the ERP module. Subsequently, the user may select the Sales Invoice sub-module and a corresponding data access request may be transmitted to the access module 122. In an example, each of the sub-modules has an XML file associated with it. In a case where the sub-module is a generic sub-module, i.e., common across different enterprises, a default XML may be linked with the sub-module. In another case where the sub-module is specific to an enterprise, a corresponding XML may exist in the access data 128.

Upon receiving the data access request, the access module 122 may initially determine whether the sub-module is a generic sub-module or a specific sub-module. Based on the type of the sub-module, the access module 122 may retrieve an XML file corresponding to the sub-module from the access data 128. Thereafter, the access module 122 may parse the XML file and may subsequently retrieve the data corresponding to the sub-module from the database 108. In an example, upon parsing the XML file, the access module 122, may call an application programming interface (API) for retrieving the data from a schema, corresponding to the enterprise, stored in the database 108. In another example, upon parsing the XML file, the access module 122 may execute a query for retrieving the data from the schema stored in the database 108.

In an implementation, upon retrieving the data, the access module 122 may create a data XML file based on the data. The access module 122 may then transmit the data XML file along with a server configuration file to the UE 104-1 for rendering to the data to the user. In an example, a jsp engine on the UE 104-1 may parse the data XML file and may subsequently display the data to the user.

In an implementation, the access module 122 may further receive an analysis request pertaining to the data from the UE 104-1. The analysis request may be understood as a request for the access module 122 to retrieve and analyze the data pertaining to the sub-module based on one or more parameters. For instance, a user, such as an HR admin, may seek to find out leaves pattern of an employee. In said example, the parameters may include the details of the employee. In said implementation, the access module 122 may retrieve the data from the database 108 and may analyze the data using predetermined analytics technique for obtaining analysis data. For instance, in the example, where the access module 122 is to analyze the leave pattern of an employee, the access module 122 may retrieve the data pertaining to the leaves sub-module. The access module 122 may then analyze the data based on the parameter, i.e., the employee details and may obtain the leave pattern as the analysis data. The access module 122 may then transmit the analysis data to the UE 104-1 for displaying to the user.

Upon receiving the analysis data, in an example, the UE 104-1 may provide the user with an option to view the analysis data in the form of graphical widgets and charts.

In an implementation, the access module 122 may further access data pertaining to different ERP modules to which the user has access. In said implementation, the access module 122 may subsequently analyze the data for identifying tasks pending for user action. For example, the access module 122 may access data corresponding to the Project Management ERP module and may ascertain whether any tasks are pending for user's approval or not. In a case where tasks are pending, the access module 122 may subsequently transmit a notification message to the UE 104-1 for alerting the user of the tasks. Further, in a case where the user does not complete the tasks within a predetermined time period, the access module 122 may transmit a reminder to the user through UE 104-1 For example, if the user does not complete the tasks, say, within two days from the notification, the access module 122 may transmit the reminder to the UE 104-1 of the user. In an example, the reminder may be sent either through an e-mail. In another example, the reminder may be sent in the form of a short message service (SMS). In yet another example, the reminder may be sent in both the forms, i.e., via the e-mail and the SMS.

Figure 2:
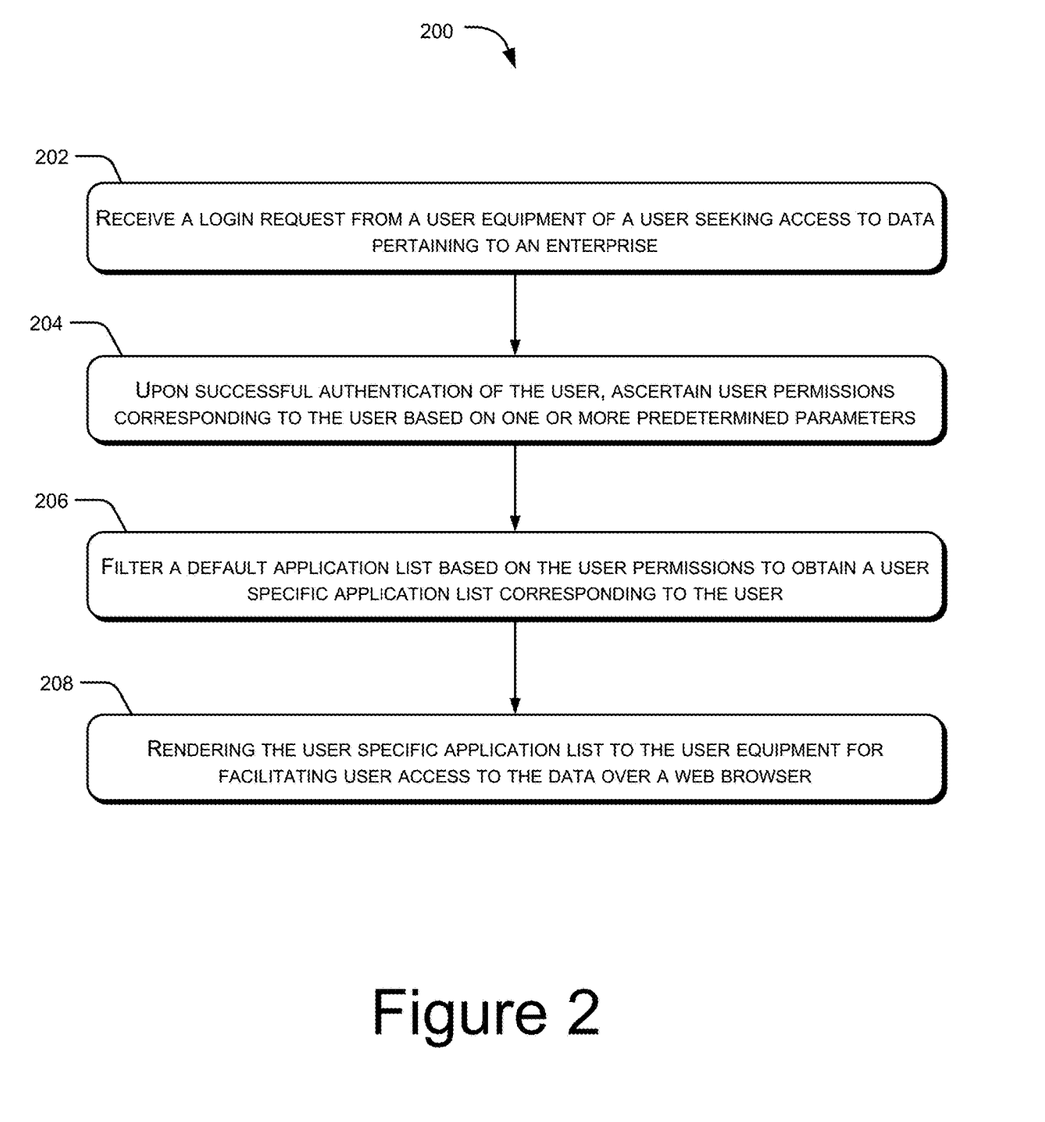
FIG. 2 illustrates a method for accessing enterprise data, in accordance with an implementation of the present subject matter.

FIG. 2 illustrates a method 200 for accessing enterprise data, according to an embodiment of the present subject matter. The method 200 may be implemented in a variety of computing systems in several different ways. For example, the method 200, described herein, may be implemented using the application server 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the application server 102, the description may be extended to other systems as well.

With reference to the description of FIG. 2, for the sake of brevity, the details of the components of the application server 102 are not discussed here. Such details can be understood as provided in the description provided with reference to FIG. 1.

Referring to the FIG. 2, at block 202, a login request from a user equipment of a user seeking access to a data pertaining to an enterprise is received. In an example, the user may seek to access data pertaining to a plurality of ERP modules. For example, the user may seek to access data pertaining to human resources, project management, customer relationship manager, and manufacturing. In said example, the user may transmit the login request to an application running an application offering ERP service. The login request may include login credentials corresponding to the user. For example, the login request may include user name and password corresponding to the user. Based on the login request, the user may then be authenticated.

At block 204, upon successful authentication of the user, user permission corresponding to the user based on one or more predetermined parameters may be ascertained. In an example, the user permission may indicate one or more ERP modules which the user may be allowed to access. Examples of the predetermined parameters may include, one or more configurations corresponding to the enterprise and a user profile of the user.

At block 206, a default application list is filtered based on the user permission to obtain a user specific application list corresponding to the user. The default application list may comprise a plurality of ERP modules which are offered by the application server. In an example, the default application list may be parsed based on the user permissions for identifying one or more ERP modules to which the user may be given access. The identified ERP modules may then be stored in the user specific application list. In an example, the default application list and the user specific application list are in the form of an XML list.

At block 208, the user specific application list is rendered to the user equipment for facilitating user access to the data over a web-browser. In an example, the application server may render the user specific application list to the user equipment. The user equipment may then display the user specific application list to the user via the web-browser.

Although implementations for methods and systems for accessing enterprise data are described, it is to be understood that the present subject matter is not necessarily limited to the specific features or methods described. Rather, the specific features and methods are disclosed as implementations for accessing enterprise data.

We claim:

1. A method for providing access to data pertaining to a plurality of enterprise resource planning (ERP) modules over a web browser running on a user equipment, the method comprising:
receiving, by an application server, a login request from the user equipment, wherein the login request comprises login credentials corresponding to a user seeking to access the data pertaining to the plurality of ERP modules;
ascertaining, by the application server, upon successful authentication of the user, configurable user permissions corresponding to the user, by retrieving predetermined parameters from a database associated with the application server, wherein the predetermined parameters comprise one or more configurations corresponding to an enterprise of the user and a user profile of the user, and wherein the one or more configurations are based on predefined policies and requirements of the enterprise associated with the user;
filtering, by the application server, a default application list including the plurality of ERP modules based on the user permissions to compile a user specific application list corresponding to the user, wherein the default application list is retrieved from the database associated with the application server and stored in rendition data, the database comprising the plurality of ERP modules for services rendered, and wherein the user specific application list comprises one or more ERP modules from amongst the plurality of ERP modules and stored in the rendition data;
rendering, by the application server, the user specific application list to the user equipment for providing access to data corresponding to the one or more ERP modules over the web browser, the user specific application list being rendered to the user equipment based on the one or more configurations stored in the database thereby averting installation of applications pertaining to each of the one or more ERP modules on the user equipment, wherein the one or more ERP modules contained in the user specific application list and the data corresponding to the one or more ERP modules are accessed by using the same login credentials;
identifying tasks corresponding to the data in the one or more ERP modules pending for user action;
transmitting a notification message to the user equipment for alerting the user of the pending tasks;
determining that the tasks remain pending for the user action for a predetermined time period; and
sending, via an e-mail and via a short message service (SMS) message, a reminder to the user to complete the tasks.

2. The method as claimed in claim 1, wherein the filtering further comprises:
retrieving the default application list; and
parsing the default application list based on the user permissions for compiling the user specific application list, wherein the parsing corresponds to selecting only the ERP modules, from the one or more ERP modules, that are accessible to the user based on the user permissions.

3. The method as claimed in claim 1, wherein the method further comprises:
receiving a user request from the user equipment for accessing an ERP module from the user specific application list;
retrieving one or more ERP sub-modules pertaining to the ERP module; and
rendering the one or more ERP sub-modules to the user equipment for displaying through the web browser.

4. The method as claimed in claim 3, wherein the method further comprises:
receiving a data access request from the user equipment for accessing data corresponding to an ERP sub-module from among the one or more ERP sub-modules;
retrieving an XML file corresponding to the ERP sub-module;
retrieving the data from a schema pertaining to the enterprise based on parsing of the XML file;
creating a data XML file based on the retrieved data; and
transmitting the data XML file and a server configuration file to the user equipment for displaying the data through the web browser.

5. The method as claimed in claim 4, wherein the method further comprises:
receiving an analysis request from the user equipment, wherein the analysis request is a request for the application server for analyzing the data based on one or more parameters;
analyzing the data based on the one or more parameters using a predetermined analysis technique for obtaining analysis data; and
transmitting the analysis data to the user equipment for displaying through the web browser.

6. The method as claimed in claim 1, wherein the login credentials pertain to an enterprise account corresponding to the enterprise, and wherein the user permissions indicate enterprise permissions corresponding to the enterprise account for seeking access to each of the plurality of ERP modules corresponding to the enterprise.

7. An application server comprising:
a processor; and
a rendition module coupled to the processor to:
receive a login request from a user equipment, wherein the login request comprises login credentials corresponding to a user seeking to access data pertaining to a plurality of enterprise resource planning (ERP) modules;
ascertain, upon successful authentication of the user, configurable user permissions corresponding to the user by retrieving one or more predetermined parameters from a database associated with the application server, wherein the predetermined parameters comprise one or more configurations corresponding to an enterprise of the user and a user profile of the user, and wherein the one or more configurations are based on predefined policies and requirements of the enterprise associated with the user;
filter a default application list including the plurality of ERP modules based on the user permissions to compile a user specific application list corresponding to the user, wherein the default application list is retrieved from the database associated with the application server and stored in rendition data, the database comprising the plurality of ERP modules for services rendered, and wherein the user specific application list comprises one or more ERP modules from amongst the plurality of ERP modules and stored in the rendition data;

render the user specific application list to the user equipment for providing access to data corresponding to the one or more ERP modules over a web browser, the user specific application list being rendered to the user equipment based on the one or more configurations stored in the database thereby averting installation of applications pertaining to each of the one or more ERP modules on the user equipment, wherein the one or more ERP modules contained in the user specific application list and the data corresponding to the one or more ERP modules are accessed by using the same login credentials;

identity tasks corresponding to the data in the one or more ERP modules pending for user action;

transmit a notification message to the user equipment for alerting the user of the pending tasks;

determine that the tasks remain pending for the user action for a predetermined time period; and send, via an e-mail and via a short message service (SMS) message, a reminder to the user to complete the tasks.

8. The application server as claimed in claim 7, wherein the rendition module further is to:

retrieve the default application list; and parse the default application list based on the user permissions for compiling the user specific application list, wherein parsing corresponds to selecting only the ERP modules, from the one or more ERP modules, that are accessible to the user based on the user permissions.

9. The application server as claimed in claim 7, wherein the application server further comprises an access module coupled to the processor to:

receive a user request from the user equipment for accessing an ERP module from the user specific application list;

retrieve one or more ERP sub-modules pertaining to the ERP module; and render the one or more ERP sub-modules to the user equipment for displaying through the web browser.

10. The application server as claimed in claim 9, wherein the access module is further configured to:

receive a data access request from the user equipment for accessing data corresponding to an ERP sub-module from among the one or more ERP sub-modules;

retrieve an XML file corresponding to the ERP sub-module;

retrieve the data from a schema pertaining to the enterprise based on parsing of the XML file;

create a data XML file based on the retrieved data; and transmit the data XML file and a server configuration file to the user equipment.

11. The application server as claimed in claim 10, wherein the access module is further configured to;

receive an analysis request from the user equipment, wherein the analysis request is a request for the application server for analyzing the data based on one or more parameters;

analyze the data based on the one or more parameters using a predetermined analysis technique for obtaining analysis data; and transmit the analysis data to the user equipment for displaying through the web browser.

12. A non-transitory computer-readable medium having embodied thereon a computer program for executing a method comprising:

receiving, by an application server, a login request from a user equipment, wherein the login request comprises login credentials corresponding to a user seeking to access data pertaining to a plurality of enterprise resource planning (ERP) modules;

ascertaining, by the application server, upon successful authentication of the user, configurable user permissions corresponding to the user by retrieving one or more predetermined parameters from a database associated with the application server, wherein the predetermined parameters comprise one or more configurations corresponding to an enterprise of the user and a user profile of the user, and wherein the one or more configurations are based on predefined policies and requirements of the enterprise associated with the user;

filtering, by the application server, a default application list including the plurality of ERP modules based on the user permissions to compile a user specific application list corresponding to the user, wherein the default application list is retrieved from the database associated with the application server and stored in rendition data, the database comprising the plurality of ERP modules for services rendered, and wherein the user specific application list comprises one or more ERP modules from amongst the plurality of ERP modules and stored in the rendition data;

rendering, by the application server, the user specific application list to the user equipment for providing access to data corresponding to the one or more ERP modules over a web browser, the user specific application list being rendered to the user equipment based on the one or more configurations stored in the database thereby averting installation of applications pertaining to each of the one or more ERP modules on the user equipment, wherein the one or more ERP modules contained in the user specific application list and the data corresponding to the one or more ERP modules are accessed by using the same login credentials;

identifying tasks corresponding to the data in the one or more ERP modules pending for user action;

transmitting a notification message to the user equipment for alerting the user of the pending tasks;

determining that the tasks remain pending for the user action for a predetermined time period; and sending via an e-mail and via a short message service (SMS) message, a reminder to the user to complete the tasks.

13. The non-transitory computer-readable medium as claimed in claim 12, wherein the filtering further comprises:

retrieving the default application list; and parsing the default application list based on the user permissions for compiling the user specific application list, wherein the parsing corresponds to selecting only the ERP modules, from the one or more ERP modules, that are accessible to the user based on the user permissions.

14. The non-transitory computer-readable medium as claimed in claim 12, wherein the method further comprises:

receiving a user request from the user equipment for accessing an ERP module from the user specific application list;

retrieving one or more ERP sub-modules pertaining to the ERP module; and rendering the one or more ERP sub-modules to the user equipment for displaying through the web browser.

15. The non-transitory computer-readable medium as claimed in claim 14, wherein the method further comprises:

receiving a data access request from the user equipment for accessing data corresponding to an ERP sub-module from among the one or more ERP sub-modules;

retrieving an XML file corresponding to the ERP sub-module;

retrieving the data from a schema pertaining to the enterprise based on parsing of the XML file;

creating a data XML file based on the retrieved data; and transmitting the data XML file and a server configuration file to the user equipment for displaying the data through the web browser.

16. The non-transitory computer-readable medium as claimed in claim 15, wherein the method further comprises:

receiving an analysis request from the user equipment, wherein the analysis request is a request for the application server for analyzing the data based on one or more parameters;

analyzing the data based on the one or more parameters using a predetermined analysis technique for obtaining analysis data; and transmitting the analysis data to the user equipment for displaying through the web browser.

17. The non-transitory computer-readable medium as claimed in claim 12, wherein the login credentials pertain to an enterprise account corresponding to the enterprise, and wherein the user permissions indicate enterprise permissions corresponding to the enterprise account for seeking access to each of the plurality of ERP modules corresponding to the enterprise.

* * * * *